United States Patent [19]

Hanamoto et al.

[11] Patent Number: 4,639,341

[45] Date of Patent: Jan. 27, 1987

[54] METHOD FOR INJECTION MOLDING ARTICLES WHILE SIMULTANEOUSLY FORMING PATTERNS THEREON

[75] Inventors: Keiji Hanamoto, Miyoshi; Fumio Takagi, Tokyo, both of Japan

[73] Assignee: Dai Nippon Insatsu Kabushiki Kaisha, Tokyo, Japan

[21] Appl. No.: 752,253

[22] Filed: Jul. 3, 1985

Related U.S. Application Data

[62] Division of Ser. No. 523,757, Aug. 16, 1983, Pat. No. 4,545,752.

[30] Foreign Application Priority Data

Aug. 17, 1982 [JP] Japan .................................. 57-142398
May 4, 1983 [JP] Japan .................................. 58-78592

[51] Int. Cl.⁴ .................... B29C 31/08; B29C 45/14; B29C 51/16
[52] U.S. Cl. .................... 264/40.1; 264/40.2; 264/40.7; 264/509; 264/511; 264/513
[58] Field of Search ............... 264/40.2, 40.7, 511, 264/513, 509, 40.1; 425/112

[56] References Cited

U.S. PATENT DOCUMENTS

| | | | |
|---|---|---|---|
| 3,126,431 | 3/1964 | Harder et al. | 264/40.7 X |
| 3,465,384 | 9/1969 | Barchi et al. | 264/40.2 X |
| 3,743,458 | 7/1973 | Hallauer et al. | 425/112 X |
| 4,360,329 | 11/1982 | Hatakeyama | 425/112 |

*Primary Examiner*—Jan Silbaugh
*Attorney, Agent, or Firm*—Koda and Androlia

[57] ABSTRACT

A strip-like pattern sheet has a plurality of patterns and register marks spaced apart from each other by a predetermined distance in its longitudinal direction. The pattern sheet is transported from a supply roll to a take-up roll in such a way that it covers the opening of a female mold. At the upper stream of the female mold, the register marks are detected so that a pattern-sheet-holding-and-transferring means holds the pattern sheet at a predetermined position and heats it. The pattern sheet is displaced by one pitch so as to cover the opening of the female mold. The softened pattern sheet is pressed by a compressed air against the cavity surface of the female mold with the cavity being evacuated. Thereafter the holding-and-transferring means is returned to its initial position and the female and male molds are mated so that molten resin is injected into the molding cavity defined between the female and male molds so that a pattern is imprinted on the surface of a molded article or finished product. The pattern may be imprinted or transferred in an efficient manner and the precise registration between the pattern and the surface of the molded article or finished product can be attained.

3 Claims, 10 Drawing Figures

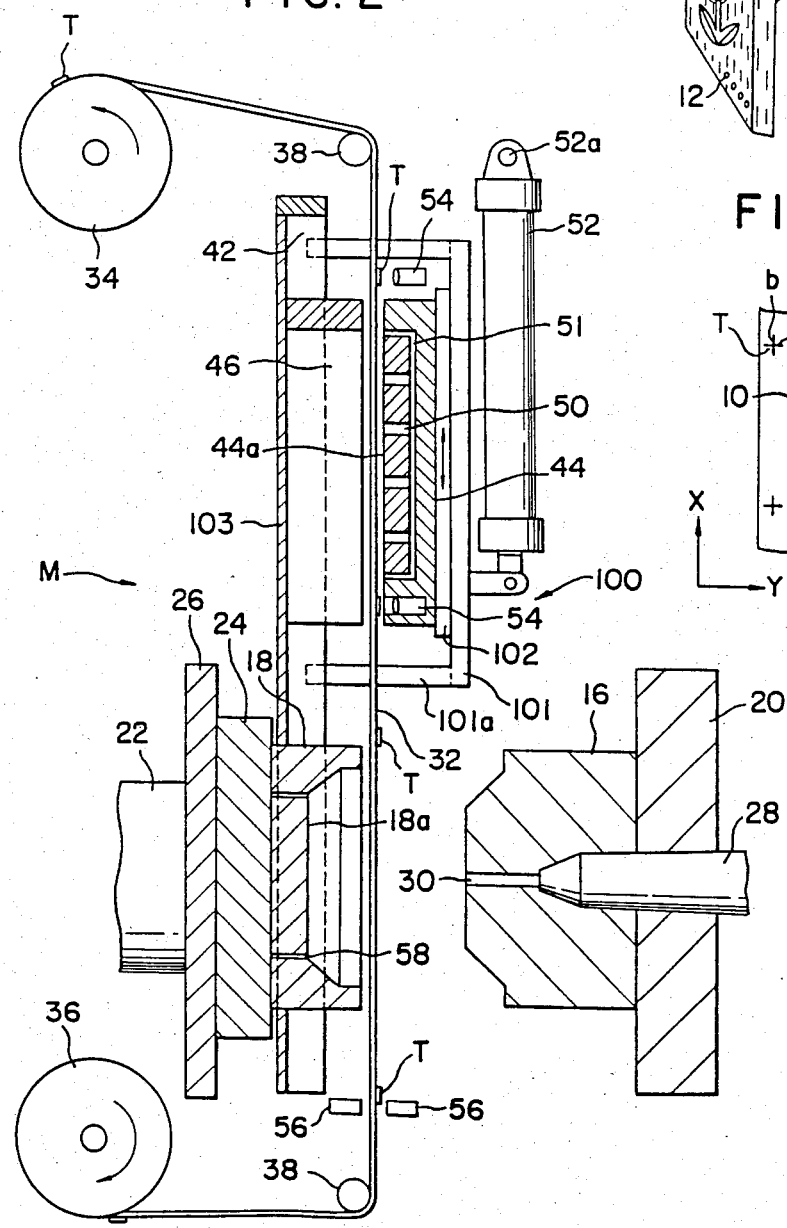
FIG. 1
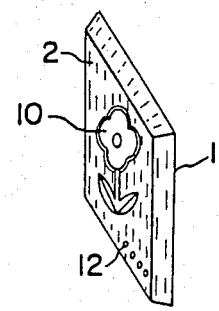
FIG. 3
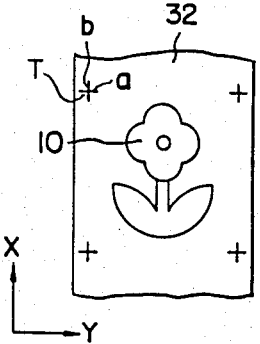

METHOD FOR INJECTION MOLDING ARTICLES WHILE SIMULTANEOUSLY FORMING PATTERNS THEREON

This is a division of application Ser. No. 523,757, filed Aug. 16, 1983, now U.S. Pat. No. 4,545,752.

BACKGROUND OF THE INVENTION

The present invention relates to a method and device for molding articles by injection molding while simultaneously imprinting on or transferring onto the molded articles patterns on a continuous sheet.

A method and device for molding articles by injection molding while simultaneously imprinting or transferring patterns on a continuous sheet on or to the molded articles mean that a sheet bearing patterns is pressed against the cavity surface of a female mold by applying the pressure or by evacuating the cavity of the female mold and a molten plastic compound is injected through a male mold into the cavity defined by the male and female molds which are mated together, whereby the patterns are imprinted or transferred on the surface of molded articles or finished products.

According to the prior art, as described in detail in Japanese Patent Publication No. 19132/1975, an injection molding machine with a male mold and a female mold is used. An operator inserts a sheet bearing patterns between the male and female molds and the air under pressure is blown out through the male mold so that the sheet may be firmly pressed against the cavity surface of the female mold. Thereafter, molten plastic material is injected through the male mold into the cavity defined by the male and female molds which are mated together so that the sheet bearing patterns may be imprinted on the surface of the molded articles and then the finished products are ejected.

It is apparently inefficient that an operator inserts a pattern bearing sheet (to be referred to as "a pattern sheet" in this specification) between the male and female molds every time when the articles are molded. Moreover, the pattern sheet must be inserted correctly between the male and female molds so that the pattern sheet may be correctly registered with the surfaces of molded articles. Furthermore, such operation is cumbersome.

SUMMARY OF THE INVENTION

It is an object of this invention to provide a method and device for molding articles by injection molding while simultaneously imprinting or transferring patterns on a sheet on the molded articles so that molded articles with patterns may be continuously molded and the correct registration between patterns and the respective surfaces of molded articles may be attained.

According to the present invention, there is provided a method for molding an article by injection molding while simultaneously imprinting on or transferring onto the molded article a pattern on a continuous pattern sheet, wherein, prior to the injection of molten plastic material, a softened pattern sheet is premolded by pressing said pattern sheet under the air pressure against the cavity surface of a female mold, and wherein the molten plastic material is injected from a male mold into the cavity defined between said male and female molds mated together with each other to integrate the molded article with the pattern on said pattern sheet, said method comprising: (a) disposing said pattern sheet which has a plurality of patterns and register marks spaced apart from each other by a predetermined distance in its longitudinal direction in such a way that said pattern sheet is transported so as to cover the opening of said female mold; (b) detecting the register marks on said pattern sheet at the upstream of said female mold so that pattern-sheet-holding-and-transferring means holds said pattern sheet at a predetermined position with respect to each pattern thereon; (c) transporting by one pitch said pattern sheet so as to cover said opening of said female mold while heating said pattern sheet; (d) pressing the softened pattern sheet against the cavity surface of said female mold, thereby pre-molding said pattern sheet; (e) returning said pattern-sheet-holding-and-transferring means to its initial position; and (f) injecting the molten plastic material through the male mold into the cavity defined by said male and female molds which are mated together, whereby the molded article is integrated with said pattern sheet.

According to the present invention, there is further provided a device for molding an article by injection molding while simultaneously imprinting on or transferring onto the molded article each pattern which is printed on a continuous sheet in a predetermined pitch, wherein the pattern sheet is pressed under the air pressure against the cavity surface of a female mold prior to the injection molding, and molten plastic material is injected from a male mold into the cavity defined by said male and female molds which are mated together, whereby said pattern sheet and the molded article are integrated with each other, said device comprising: (a) a sheet supporting means comprising a pattern-sheet supply roll and a pattern-sheet take-up roll which are so arranged that said pattern sheet is transported so as to cover the opening of a female mold; (b) a pattern-sheet-holding-and-transferring means for holding a predetermined part of the pattern sheet on which the pattern to be imprinted on or transferred onto the article is formed and transferring the part thereof to the opening of the female mold, said means comprising: (i) a cover means having a plurality of air passages in opposed relationship with the pattern sheet and a heating means for softening the pattern sheet, (ii) a frame means which coacts with said cover means so as to clamp said pattern sheet therebetween and which is movable in unison with said cover means, (iii) a transfer means which reciprocates said pattern-sheet-holding-and-transferring means by one pitch between the adjacent patterns on said pattern sheet, (iv) detection means mounted on said cover means or said frame means for detecting the register marks which are marked apart from each other by a predetermined distance on said pattern sheet, and (v) a shift means responsive to the outputs from said detection means for shifting the cover means and frame means in unison with each other to the predetermined position with respect to the pattern on the pattern sheet; and (c) an air operating means connected to the air passages of the cover means to such the pattern sheet against the heating means of the cover means and to press the pattern sheet against the cavity surface of the female mold.

The above and other objects, effects, features and advantages of the present invention will become more apparent from the following description of a preferred embodiment thereof taken in conjunction with the accompanying drawing.

BRIEF DESCRIPTION OF THE DRAWINGS

FIG. 1 is a perspective view of a molded article with a pattern;

FIG. 2 is a longitudinal sectional view of a device for molding articles by injection molding while simultaneously imprinting or transferring patterns on the molded articles;

FIG. 3 is a plan view of a pattern sheet;

DETAILED DESCRIPTION OF THE INVENTION

Figure 4:
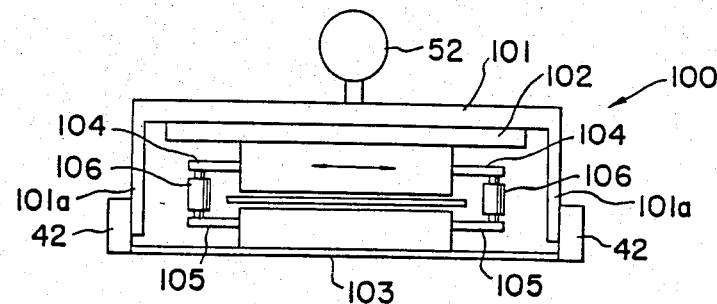
FIG. 4 is a plan view showing a sheet-holding-and-transferring device.

In FIG. 1 is shown an article or finished product molded in accordance with the present invention. A pattern sheet 2 is attached onto the surface of the article 1. A flower pattern 10 is imprinted on the raised portion of the article and characters or letters 12 are imprinted at the lower portion of the pattern sheet 2.

In FIG. 2 is shown in vertical cross section an injection molding machine M in accordance with the present invention. It comprises a male mold 16 securely attached to a stationary plate 20 and a female mold 18 securely mounted on a movable plate 24 which is movable toward or away from the male mold 16 by means of a ram 22. An ejector 26 is disposed adjacent to the movable plate 24 for ejecting a molded article out of the mold by pins (not shown).

An injection device 28 is extended through the stationary plate 20 and the male mold 16 and is communicated with a nozzle 30 so that a molten plastic material is forced through the injection device 28 and the nozzle 30 into the cavity of the female mold 18.

A pattern sheet 32 is vertically transported between the male and female molds 16 and 18; that is, the pattern sheet 32 is unrolled from a supply roll 34 and is taken by a take-up roll 36. The travel of the pattern sheet 32 from the supply roll 34 to the take-up roll 36 is controlled by an upper and a lower guide roll 38. The supply roll 36 is biased in the clockwise direction under the force of a spring (not shown) while the take-up roll 36 is biased in the counterclockwise direction under the force of a spring (not shown) in FIG. 2 so that tension is exerted on the pattern sheet 32.

The pattern sheet 32 has desired patterns which are spaced apart from each other by a suitable distance in the longitudinal direction. The pattern sheet 32 is set according to the type of forming patterns on the article. That is, when the sheet 32 is so set that the patterns thereon face the male mold 16, the patterns are formed on the backside of the sheet covering the molded article. On the contrary, when the sheet 32 is so set that the patterns thereon face the female mold 18, the patterns are formed on the front surface of the sheet covering the molded article. When only ink for forming the patterns on the pattern sheet 32 is transferred onto the surface of the molded article, the pattern sheet 32 must be so set that the patterns thereon face the male mold 16.

The pattern sheet 32 is provided with register marks T which are spaced apart by a predetermined distance in the longitudinal direction. Each register mark T comprises a horizontal line segment a for determining the vertical position (the x-direction) of the sheet 32 and a vertical line segment b for determining the horizontal position (the y-direction) thereof. That is, the register mark T is in the form of +, but it is to be understood that the horizontal line segment a and the vertical line segment b may be marked separately.

Over the two molds are provided a pattern-sheet-holding-and-transferring device 100 which transfers a pattern on the sheet 32 by the predetermined distance onto the female mold 18 while holding and heating the sheet 32.

The device 100 has a supporting plate 101 on which a moving plate 102 slidable vertically is mounted via a known shift mechanism including a drive screw and a servomotor (not shown). On the moving plate 102 is mounted a cover member 44 which can slide in the lateral direction (the direction perpendicular to the direction in which the moving plate 102 can slide on the supporting plate 101) via the same shift mechanism as above.

The cover member 44 faces a frame member 46 which is movable integrally with the member 44 on a base plate 103 but cannot separate away from the surface of the base plate 103. The base plate 103 is provided between two vertical rails 42 which extend vertically on the opposite sides of the female mold 18. Furthermore, the female mold 18 is adapted to project through an opening formed in the base plate 103.

From the sides of the frame and cover members 44 and 46 are projected four arms 104 and 105, respectively, between which two air-cylinders 106 are provided as shown in FIG. 4. The air-cylinders 106 function to pull the cover member 44 toward the frame member 46 to hold the pattern sheet 32.

Instead of the air cylinders 106, oil cylinders or electric motor may be used. The supporting plate 101 has a plurality of legs 101a at its four corners, which engage with the rails 42.

The frame member 46 is disposed in opposed relationship with a cover member 44 which has a heating unit 44a embedded therein. The frame member 46 is in the shape of a letter U. The cover member 44 is provided with a plurality of air passages 50 which in turn are communicated with a common air passage 51 which in turn is communicated with an air operating means including a vacuum pump, a compressed air source and a change-over valve (all not shown). The heating unit 44a may comprise a heat plate, a sintered metal plate or a high-frequency heating plate.

The sheet-holding-and-transferring device 100 is vertically moved by means of an air cylinder 52, the upper end of which is pivoted at 52 to a stationary frame (not shown) and the lower end of which is pivoted to the supporting plate 101.

Detectors such as photosensors 54 are located at the positions above and below the cover member 44 or the frame member 46 and are adapted to detect the register marks T on the pattern sheet 32. It is preferable to provide two detectors 54 for determining the position in the X-direction and two detectors 54 for determining the position in the Y-direction.

Pressure members 56 are disposed in opposed relationship with each other below the female mold 18 and are adapted to clamp the pattern sheet 32. The pressure members 56 are moved toward or away from each other by means of an air cylinder (not shown) mounted on the movable plate 24. The pressure members 56 are extended transversely of the pattern sheet 32 and one of the pressure members 56 is held stationary while the other is moved toward or away from the one.

The female die 18 is provided with air passages 58 which will be described in more detail hereinafter.

The mode of operation will now be described. First the cover member 44 and the frame member 46 are moved in unison with each other away from a reference position to detect the register mark T. When the detectors 54 detect the horizontal line segment a of the register mark T, a control circuit (not shown) stops the operation of the moving mechanism. Thereafter the cover and frame members 44 and 46 are caused to move in the Y-direction by means of another moving mechanism. When the detectors 54 detect the horizontal line segment b, the control circuit stops the operation thereof. Thus the cover plate 44 is displaced to a predetermined position with respect to a pattern on the pattern sheet 32.

Thereafter, the vacuum pump is operated so that the air is sucked through the air passages 50 and the common air passage 51 of the cover member 44, whereby the pattern sheet 32 is firmly sucked against the heating element 44a. Next the air cylinders 106 is actuated so that the cover member 44 is caused to move toward the frame member 46, whereby the pattern sheet 32 is clamped between the cover and frame members 44 and 46. At this time, as the moving plate 102 and the cover member 44 are adapted not to be separated away from the supporting plate 101 and the moving plate 102, respectively, the cylinder 52 is slightly rotated toward the frame member 46 around the axis 52a.

Figure 5:
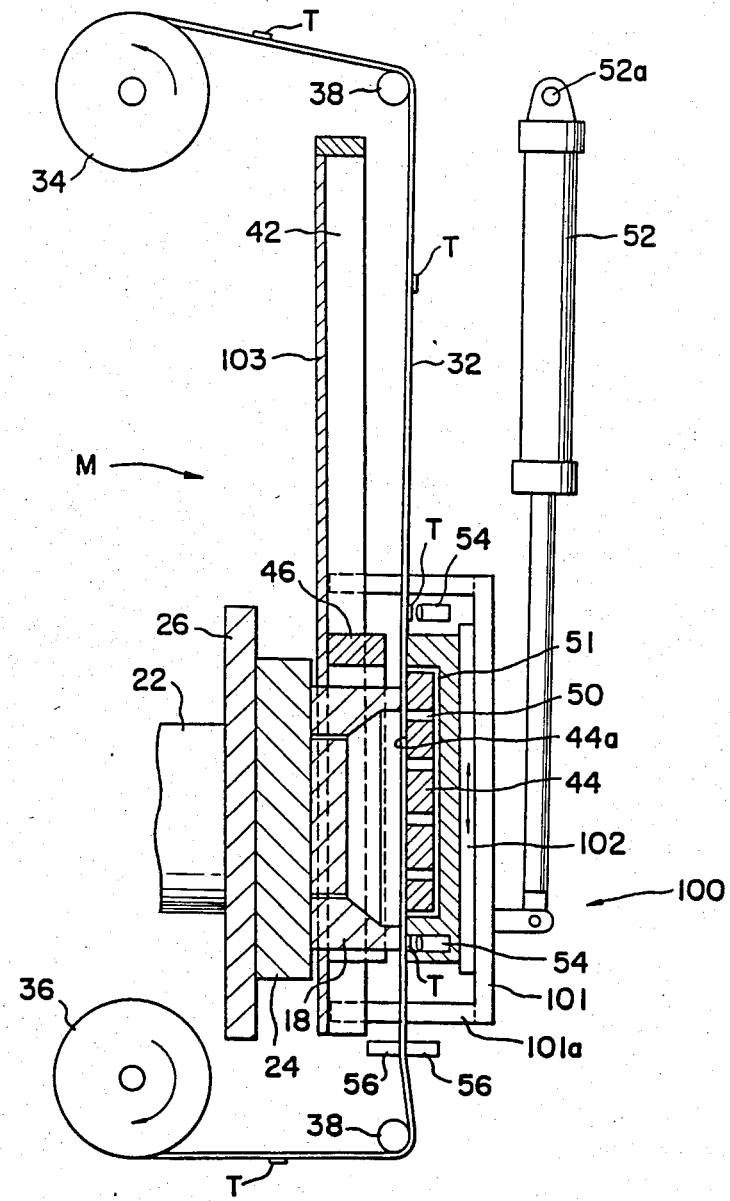
FIG. 5 is a view similar to FIG. 2 but shows that a pattern sheet is ready to be pre-molded.

Thereafter the two moving mechanisms are operated again so that the cover and frame members 44 and 46 are returned to their reference or initial positions. Then, the piston rod of the air cylinder 52 is extended as shown in FIG. 5 to cause the sheet-holding-and-transferring-device 100 to move downward along the rails 42 and are stopped at the predetermined position in opposed relationship with the female mold 18. At this time, the pattern sheet 32 is unrolled and advanced by a predetermined distance (that is, one pitch between the adjacent patterns). The pattern sheet 32 is heated and softened by the heating unit 44a during its travel. Since the frame member 46 is in the form of a letter U, it may surround the female mold 18 and the cover plate 44 upon which the pattern sheet 32 is pressed closes the cavity of the female mold 18. In this case, the pattern on the pattern sheet 32 is in predetermined positional relationship with the bottom 18a of the cavity of the female mold 18.

Figure 6:
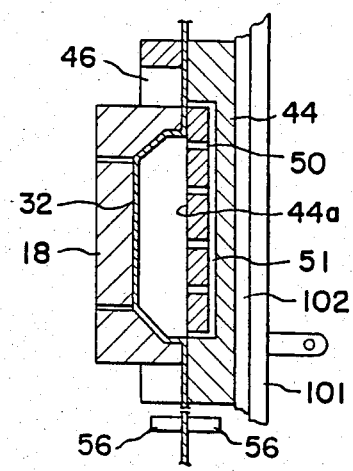
FIG. 6 is a longitudinal sectional view of a female mold and a cover plate showing a premolded pattern sheet pressed against the cavity surface of the female mold.

Under these conditions, the air in the cavity of the female die 18 is evacuated through the air passages 58 while the compressed air is blown through the common air passage 51 and the air passages 50 of the cover member 44 by changing the change over valve of the air operating means so that the pattern sheet 32 is forced to be separated from the surface of the heating unit 44a and pressed against the cavity surfaces of the female die 18 as shown in FIG. 6. If the cavity of the female mold 18 is deep, a part of the cover member 44 may be moved toward the cavity of the female mold 18 while holding the pattern sheet 32 so that when the cavity of the female mold 18 is evacuated, the pattern sheet may be pre-molded without being expanded excessively.

So far it has been described that after the cavity of the female mold 18 has been evacuated, the compressed air is supplied through the common air passage 51 and the air passages 50 so that the pattern sheet 32 is pressed against the surfaces of the cavity of the female mold 18, but it is to be understood that while the compressed air is supplied through the air passages 50 in the manner described above, the air in the cavity of the female mold 18 may be discharged through the air passages 58 without evacuating operation. In the latter case, the female mold 19 must be provided a relatively large number of air discharge passages 58. However, the openings of such passages 58 are imprinted on the surface of the molded articles or finished products. As a result, such arrangement is not preferable in practice. Furthermore, when the air remains in the cavity of the female mold 18, undesired recesses are formed on the surfaces of the molded articles or finished products. However, according to the present invention, the cavity of the female mold 18 is evacuated as described above, so that it is not needed to provide a plurality of air discharge passages. Accordingly, the trace of the openings of the air passages 58 is almost not left on the surfaces of molded articles or finished products.

Thereafter, the air cylinder 106 is so actuated that the cover member 44 is moved away from the frame member 46 to release the sheet 32. After this, the piston rod of the air cylinder 52 is retracted to cause the device 100 to return to their initial positions as shown in FIG. 2. In this case, the pressure members 56 clamp the pattern sheet 32 to prevent the pattern sheet 32 from moving upwardly.

Thereafter, the ram 22 is actuated so that the female mold 18 is moved toward the male mold 16. Molten plastic material is injected through the injection device 28 and the nozzle 30 into a cavity 60 defined by the mated male and female molds 16 and 18, whereby molded articles on which the patterns are imprinted can be obtained.

The operation of the air cylinder 52 and other air cylinders 106 is controlled by a conventional control circuit (not shown).

When molding material is ABS, PS, PP, PE, urethane or acryl, it will not adhere to the pattern sheet 32. Accordingly, in this case only ink patterns on the pattern sheet 32 are transferred onto the surfaces of the molded articles or finished products.

Figure 8:
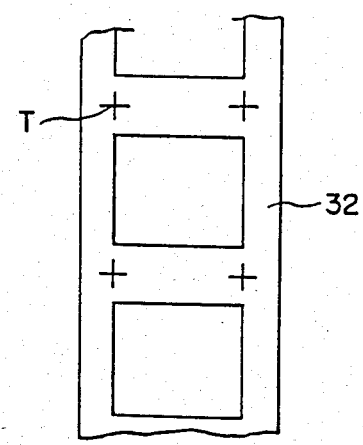
FIG. 8 is a plan view of the pattern sheet after the injection molding cycle.
Figure 7:
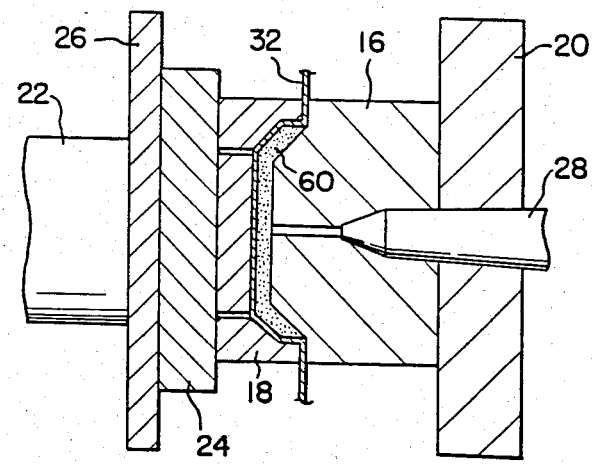
FIG. 7 is a longitudinal sectional view of the female mold and a male mold during an injection molding cycle.

If the pattern sheet 32 can adhere to the surface of molded articles or finished products, it is punched as shown in FIG. 8, but when only an ink image is transferred to the molded articles or finished products, the pattern sheet 32 is not punched as shown in FIG. 8.

As described above, according to the present invention, in response to the output signals from the detectors, the cover member 44 is moved to a predetermined position with respect to the pattern sheet 32. Then the pattern sheet 32 is sucked against the heating unit 44a of the cover member 44 so that the pattern sheet 32 is held while being heated. Thereafter, the cover member 44 is moved to a predetermined position with respect to the female mold 18 and the cavity of the female mold 18 is evacuated and the compressed air is supplied to the back of the pattern sheet 32 so that the pattern sheet 32 is pressed against the cavity surface 18a of the female mold 18. Thus, a pattern on the pattern sheet 32 is correctly registered with the cavity surface of the female mold 18.

The pattern sheet 32 is heated while it is sucked against the heating unit 44a of the cover member 44. Therefore, there is no fear that the pattern sheet 32 is separated from the heating unit 44a of the cover member 44 and the pattern on the pattern sheet 32 is misaligned with respect to the cavity surface of the female mold 18.

In the case of a horizontal injection molding machine in which the male and female molds are horizontally moved toward or away from each other while the pattern sheet 32 is vertically transported, the loosening of the pattern sheet 32 due to heating gives rise to a serious problem, but this problem can be substantially overcome in accordance with the present invention.

Figure 9:
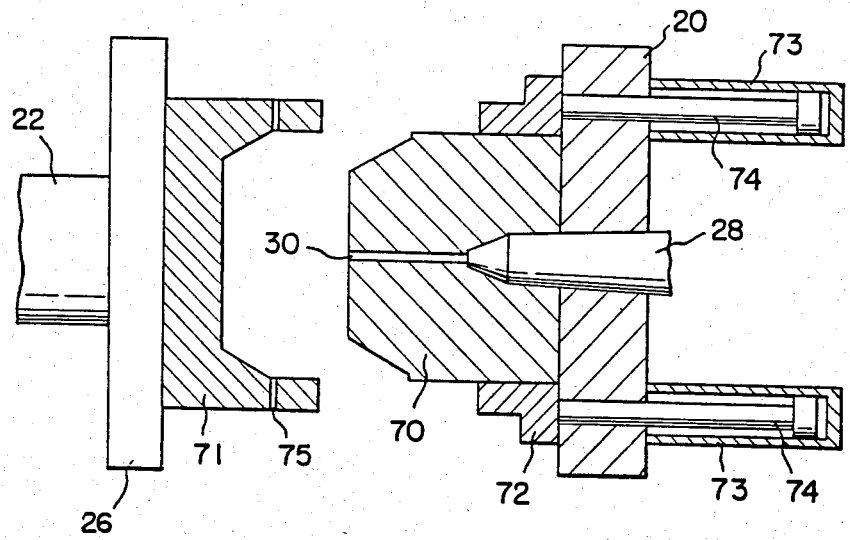
FIG. 9 is a sectional view of a male mold and a female mold used in a second embodiment of the present invention.
Figure 10:
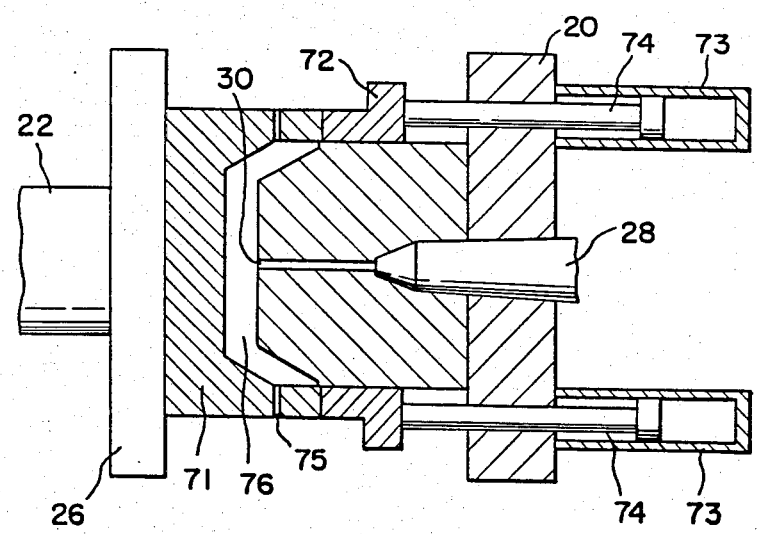
FIG. 10 is a sectional view similar to FIG. 9 but shows that an injection molding cycle is ready to be started.

Furthermore, as shown in FIGS. 9 and 10, the male and female molds may be so arranged that the thicknesses of the molded articles or finished products may be varied. That is, the cavity of a female mold 71 is deep and the female mold 71 is moved toward or away from a male mold 70. An adjusting frame 72 is fitted over the male mold 70 and is connected to the piston rods 74 of cylinders 73 mounted on the stationary plate 20. As a result, when the cylinders 73 are actuated, the frame 72 can be moved toward or away from the female mold 71. The leading end of the frame 72 is adapted to engage with the upper periphery of the female mold 71. When the position of the leading end of the frame 72 is suitably adjusted by actuating the cylinders 73, the depth of the cavity 76 of the female mold 71; that is, the thicknesses of the molded articles or finished products can be adjusted.

So far the detectors 54 have been described as detecting the X-direction first and then the Y-direction, but it is to be understood that they can simultaneously detect both the X- and Y-directions.

So far the present invention has been described in conjunction with the horizontal injection molding machine, but it is to be understood that the present invention may be equally applied to the vertical injection molding machines in which the male and female molds are vertically moved toward or away from each other. In the latter case, the cover and frame members 44 and 46 are moved horizontally.

Furthermore, it is to be understood that air passages 75 may be extended through the side wall of the female mold 71 as shown in FIGS. 9 and 10.

What is claimed is:

1. A method for molding an article by injection molding while simultaneously imprinting on or transferring onto the molded article a pattern on a continuous pattern sheet, wherein, prior to the injection of molten plastic material, a softened pattern sheet is pre-molded by pressing said pattern sheet under an air pressure against the cavity surface of a female mold, and wherein the molten plastic material is injected from a male mold into the cavity defined between said male and female molds mated together with each other to integrate the molded article with the pattern on said pattern sheet, said method comprising the steps of:

(a) disposing said pattern sheet which has a plurality of patterns and register marks spaced apart from each other by a predetermined distance in its longitudinal direction in such a way that said pattern sheet is transported so as to cover the opening of said female mold;

(b) detecting the register marks on said pattern sheet at the upstream of said female mold to cause pattern-sheet-holding-and-transferring means to actuate in a manner to hold said pattern sheet at a predetermined position with respect to each pattern thereon;

(c) sucking the pattern sheet against heating means of the pattern-sheet-holding-and-transferring means through air passages formed therein at an initial position wherein the pattern-sheet-holding-and-transferring means is located at the upstream of the female mold;

(d) moving the pattern-sheet-holding-and-transferring means to the female mold from its inital position while its heating means holds and heats the pattern sheet to be softened in order to transport by one pitch said pattern sheet so as to cover said opening of said female mold while heating said pattern sheet;

(e) pressing the softened pattern sheet transfered over a cavity of the female mold against a cavity surface thereof by blowing compressing air through air passages, thereby premolding the pattern sheet;

(f) returning said pattern-sheet-holding-and-transferring means to its initial position; and (g) injecting the molten plastic material through the male mold into the cavity defined by said male and female molds which are mated together, whereby the molded article is integrated with said pattern sheet.

2. A method as set forth in claim 1, wherein the step of detecting the register marks on the pattern sheet is carried out in a manner such that photosensor means mounted on the pattern-sheet-holding-and transferring means detect a first line segment for showing a position in the first direction in which said pattern sheet is transported, and a second line segment for showing a position in the second direction perpendicular to said first direction in which said pattern sheet is transported.

3. A method as set forth in claim 1, wherein the step of premolding the pattern sheet is carried out in a manner that the cavity of the female mold is evacuated while compressed air is blown out of the air passages.

* * * * *